Patented Apr. 19, 1932

1,854,423

UNITED STATES PATENT OFFICE

JOSEPH C. PATRICK, OF KANSAS CITY, MISSOURI, ASSIGNOR OF ONE-HALF TO NATHAN M. MNOOKIN, OF KANSAS CITY, MISSOURI

RUBBER COMPOSITION

No Drawing.   Application filed May 28, 1928. Serial No. 281,376

This invention relates to rubber compositions and particularly to a composition comprising rubber and high sulfur plastic hereinafter identified.

In application Serial No. 239,808, filed December 13, 1927, I have described a new plastic derived from the interaction of halogen additive compounds of olefins with soluble polysulfides, especially those of the alkali metals, alkaline earth metals and ammonia, which may conveniently be termed "alkaline polysulfides". These plastics may be conveniently designated olefin polysulfide plastics, since in their production, the halogen is eliminated. The mechanical properties of such plastics can be controlled to a considerable degree by regulation of the sulfur content of the polysulfide used in their preparation. For example, ethylene halogen additive compounds react with polysulfide solutions with a sulfur content corresponding approximately to the formulæ $CaS_4$ and $Na_2S_4$ to give a soft, pliable and elastic plastic, somewhat resembling soft vulcanized rubber in appearance, while lower polysulfides corresponding in sulfur content to $Na_2S_2$ or $Na_2S_3$ or a mixture thereof gave hard plastics which resemble vulcanite in appearance and mechanical properties. These plastics are characterized by a high sulfur content.

The soft plastic derived from ethylene chloride may contain between 74 and 84.5% of sulfur while the hard plastic has a somewhat lower sulfur content. The hard plastic melts around 100 to 120° C. while the softer plastic softens above 140° C. but does not become as fluid as the molten hard plastic.

While this plastic consists largely of sulfur, the sulfur is in combined state and cannot be extracted directly therefrom unless the compound is decomposed.

I have found that this plastic possesses vulcanizing properties and that when incorporated with unvulcanized rubber and the mixture subjected to vulcanizing conditions, there results valuable products which may be described generally as resembling to a marked degree both in appearance and in mechanical properties, soft vulcanized rubber.

The vulcanized products thus produced are characterized by the fact that they contain no free or elemental sulfur. They may therefore be advantageously substituted for rubber in situations where the excess sulfur of rubber is objectionable; for example, these products are remarkably suitable for insulating purposes, since they have a high dielectric strength and contain no free sulfur which would attack conductors such as copper.

The relative proportions of plastic and rubber may vary over very wide limits. The addition of a few percent of rubber imparts highly valuable properties to the plastic and as the amount of rubber is increased the compounds more closely approach vulcanized rubber with respect to tensile strength and other valuable mechanical properties.

Both the hard plastic and the soft plastic as well as plastics of intermediate classification may be employed according to the present invention. In general it is preferred to employ the soft plastics because of their higher sulfur content, cheapness and the superior properties of the resulting products.

Various additions may be made to the composition before vulcanization. Such additions may comprise fillers, pigments and the like. Among such substances may be mentioned lead oxides, litharge, zinc oxide, calcium carbonate, calcium oxide, carbon black, glue and other additions employed in rubber compounding.

Small quantities of various vulcanizing accelerators, such as diphenyl guanidine, hexamethylenetetramine, aldehyde-ammonia aniline, thiocarbanilide and isopropyl-xanthogenate tetrasulfide may be added to the composition before vulcanization. Ordinarily the addition of an accelerator is unnecessary since vulcanization of rubber is remarkably accelerated in the presence of the aforesaid plastic.

By the term "unvulcanized rubber" I intend to include not only new rubber but also reclaimed rubber, although the results with the latter are not as good as with the former. Mixtures of new and reclaimed rubber may suitably be employed. Since reclaimed rubber usually contains some free sulfur, it should not be employed when a product free from elemental sulfur is desired.

In preparing the unvulcanized composition, the plastic, unvulcanized rubber and additions, if any, are incorporated in a mill at about 80° C. Although the temperature is below the melting or softening point of the plastic, the materials become thoroughly mixed without difficulty. The resulting compound is rubbery to the touch and can be readily molded and formed into desired shapes, being softened by heat, if necessary. It may be vulcanized in manner analogous to the vulcanization of rubber.

The invention will be more completely understood from the following examples. The plastic employed therein is the high sulfur soft plastic derived from ethylene.

Example I

|  | Per cent |
|---|---|
| Soft plastic (83% sulfur) | 39.8 |
| Pale crepe rubber | 39.8 |
| Zinc oxide | 16.0 |
| Hard wood pitch | 4.0 |
| Isopropyl-xanthogenate tetrasulphide | 0.4 |

Samples were vulcanized for 60, 90 and 120 minutes at 277° F., yielding products of great strength resembling soft cured rubber in appearance and mechanical properties. Endeavors to remove free sulfur by extraction with sulfur solvents gave negative results.

Example II

|  | Per cent |
|---|---|
| Plastic (83% sulfur) | 32.8 |
| Smoked sheet rubber | 19.7 |
| Zinc oxide | 32.8 |
| Lead oleate | 6.5 |
| Hard wood pitch | 1.7 |
| Carbon black (No. 1) | 6.5 |

On vulcanization for about 1 hour at 288° F. a product is obtained which has properties resembling those of the product of Example I. The product is substantially darker in color, has a very great tensile strength but appears to have a slightly greater permanent set than the product of Example I.

Example III

|  | Per cent |
|---|---|
| Pale crepe rubber | 49.75 |
| Plastic (83% sulfur) | 49.75 |
| Hexamethylenetetramine | 0.50 |

This composition showed unmistakable evidence of vulcanization on standing at ordinary temperatures. When vulcanized at 276° F. for 90 minutes a strong rubber-like elastic material was produced.

Example IV

|  | Per cent |
|---|---|
| Pale crepe rubber | 41.5 |
| Plastic (83% sulfur) | 41.5 |
| Zinc oxide | 16.5 |
| Hexamethylenetetramine | 0.5 |

On vulcanizing for 90 minutes at 276° F. a product was obtained which was similar to that of Example III.

Although the present invention has been described in connection with the details of specific examples thereof, it is not intended that such details shall be regarded as limitative upon the scope of the invention except in so far as included in the accompanying claims.

I claim:

1. A vulcanizable composition comprising a compound which is the reaction products of polysulfides and olefins of the formula $C_nH_{2n}$ and unvulcanized rubber.

2. A vulcanizable composition comprising a compound which is the reaction products of polysulfides and olefins of the formula $C_nH_{2n}$ and unvulcanized rubber, said composition being substantially free from elemental sulfur.

3. A vulcanizable composition comprising a compound which is the reaction products of polysulfides and olefins of the formula $C_nH_{2n}$ and unvulcanized rubber in substantial quantity relative to the amount of plastic.

4. A vulcanizable composition comprising a compound which is the reaction products of polysulfides and olefins of the formula $C_nH_{2n}$ and unvulcanized rubber in substantial quantity relative to the amount of plastic, said composition being substantially free from elemental sulfur.

5. A vulcanizable composition comprising a compound which is the reaction products of polysulfides and olefins of the formula $C_nH_{2n}$ and unvulcanized rubber in substantially equal quantities.

6. A vulcanizable composition comprising a compound which is the reaction products of polysulfides and olefins of the formula $C_nH_{2n}$ and unvulcanized rubber in substantially equal quantities, said composition being substantially free from elemental sulfur.

7. A vulcanizable composition comprising a soft compound which is the reaction products of polysulfides and olefins of the formula $C_nH_{2n}$ and unvulcanized rubber.

8. A vulcanizable composition comprising a soft compound which is the reaction products of polysulfides and olefins of the formula $C_nH_{2n}$ and unvulcanized rubber, said composition being substantially free from elemental sulfur.

9. A vulcanizable composition comprising a soft compound which is the reaction products of polysulfides and olefins of the formula $C_nH_{2n}$ and unvulcanized rubber in substantial quantity relative to the amount of plastic.

10. A vulcanizable composition comprising a soft compound which is the reaction products of polysulfides and olefins of the formula $C_nH_{2n}$ and unvulcanized rubber in substantial quantity relative to the amount of plastic, said composition being substantially free from elemental sulfur.

11. A vulcanizable composition comprising a soft compound which is the reaction products of polysulfides and olefins of the formula $C_nH_{2n}$ and unvulcanized rubber in substantially equal quantities.

12. A vulcanizable composition comprising a soft compound which is the reaction products of polysulfides and olefins of the formula $C_nH_{2n}$ and unvulcanized rubber in substantially equal quantities, said composition being substantially free from elemental sulfur.

13. As a new composition of matter, a vulcanized material containing substantial quantities of rubber and substantial quantities of a compound which is the reaction products of polysulfides and olefins of the formula $C_nH_{2n}$ and substantially free from elemental sulfur.

14. As a new composition of matter, a vulcanized material strongly resembling soft vulcanized rubber in mechanical properties and comprising substantial quantities of rubber and a compound which is the reaction products of polysulfides and olefins of the formula $C_nH_{2n}$ and substantially free from elemental sulfur.

15. As an article of manufacture, a vulcanized material strongly resembling soft vulcanized rubber in mechanical properties containing a compound which is the reaction products of polysulfides and olefins of the formula $C_nH_{2n}$ and vulcanized rubber and substantially free from elemental sulfur.

16. The method of producing a vulcanized material which comprises admixing rubber with the product resulting from the reaction of polysulfides and compounds of olefins of the formula $C_nH_{2n}$ and heating the mixture under vulcanizing conditions.

17. The method of producing a vulcanized product which comprises admixing the product resulting from the reaction of polysulfides and compounds of olefins of the formula $C_nH_{2n}$ containing in excess of 74% sulfur with rubber, and heating the mixture under vulcanizing conditions.

18. The method of producing a vulcanized compound which comprises admixing the product resulting from the reaction of polysulfides and ethylene dichloride with rubber and heating the mixture under vulcanizing conditions.

In testimony whereof I have hereunto set my hand this 10th day of May, 1928.

JOSEPH C. PATRICK.